Nov. 23, 1937.    J. R. GAMMETER    2,100,029
POROUS RUBBER PRODUCT AND METHOD OF MAKING THE SAME
Filed April 8, 1933    2 Sheets-Sheet 1
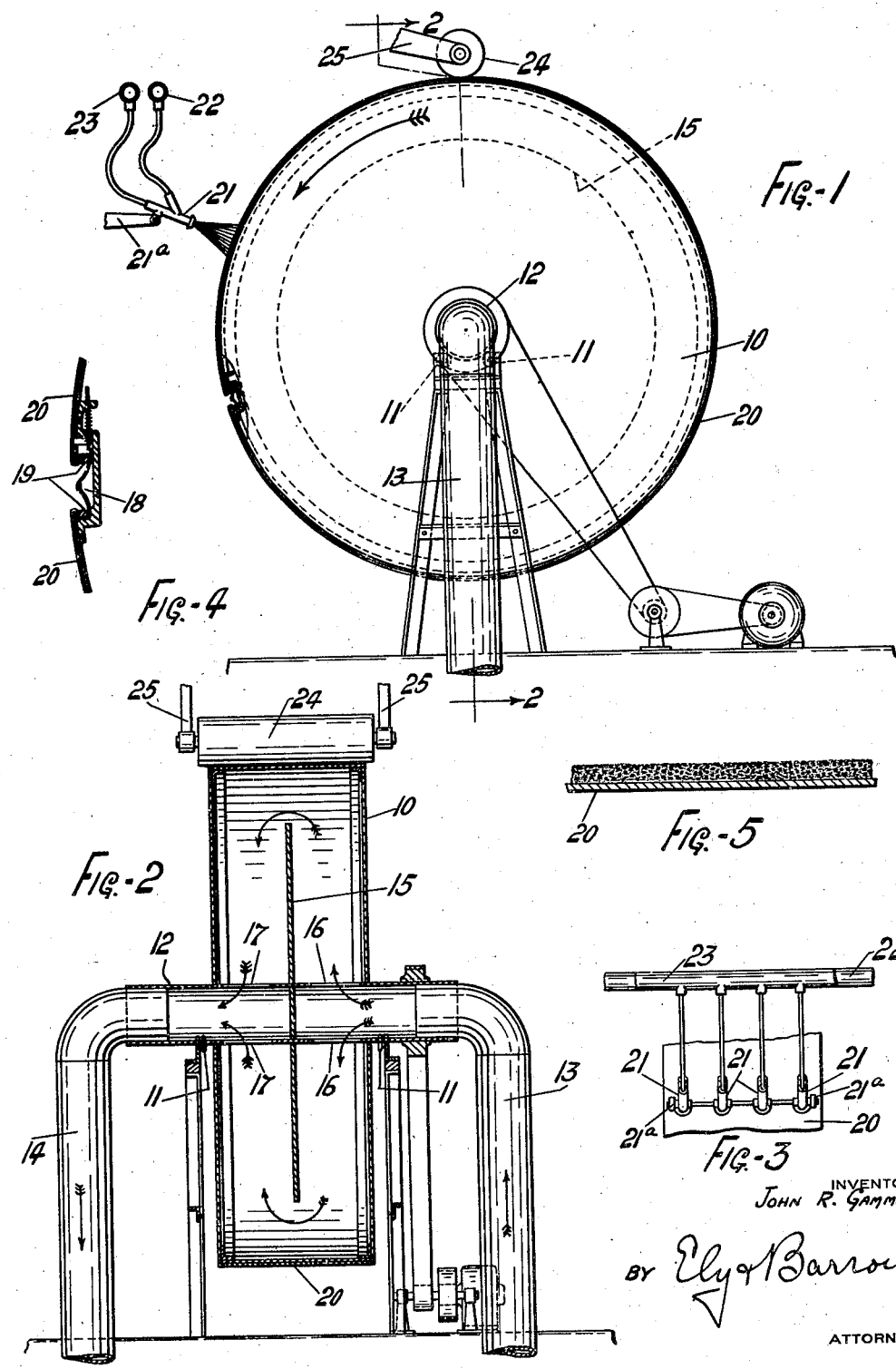
INVENTOR
JOHN R. GAMMETER
BY Ely & Barrow
ATTORNEYS Nov. 23, 1937. J. R. GAMMETER 2,100,029
POROUS RUBBER PRODUCT AND METHOD OF MAKING THE SAME
Filed April 8, 1933 2 Sheets-Sheet 2
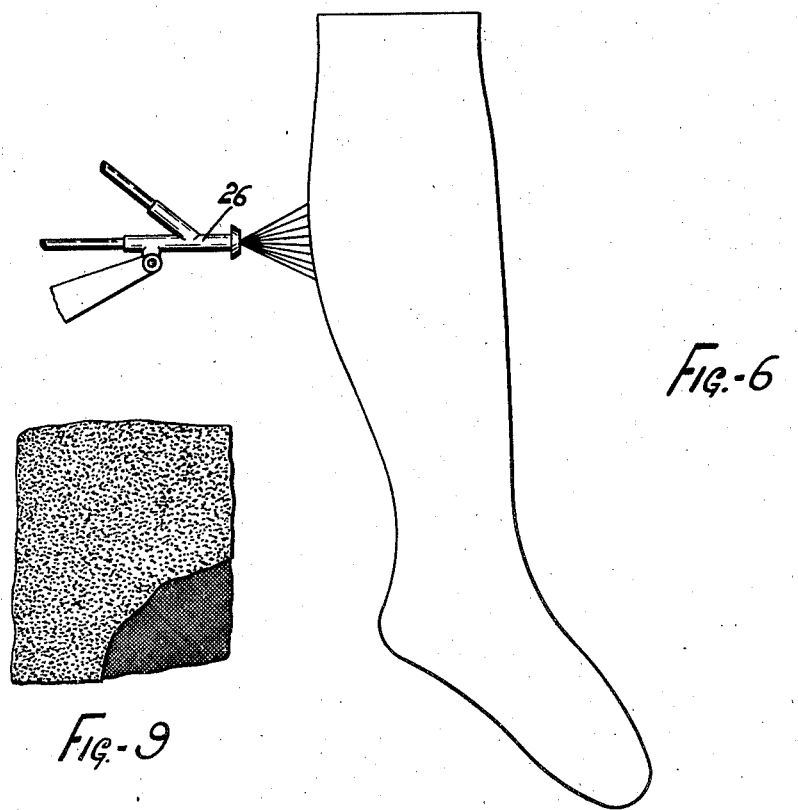
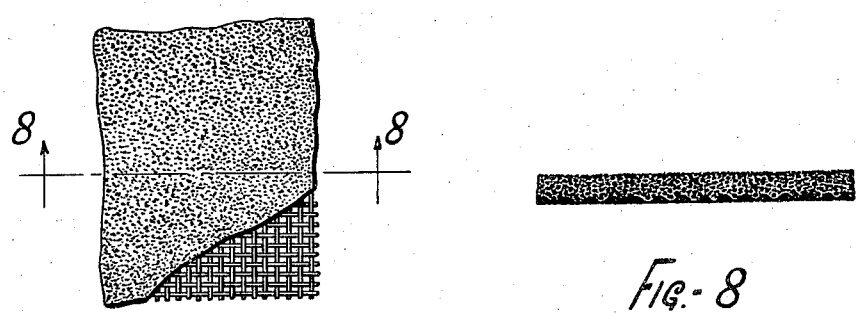
INVENTOR
JOHN R. GAMMETER
BY Ely & Barrow
ATTORNEYS Patented Nov. 23, 1937

2,100,029

UNITED STATES PATENT OFFICE 2,100,029

POROUS RUBBER PRODUCT AND METHOD OF MAKING THE SAME

John R. Gammeter, Akron, Ohio, assignor to United States Rubber Company, New York, N. Y., a corporation of New Jersey Application April 8, 1933, Serial No. 665,080

16 Claims. (Cl. 91—68)

This invention relates to rubber products such as sheet rubber products, either reinforced or not with fabrics or backing sheets of various materials, and procedure for making the same.

The purpose of the present invention is to provide an improved rubber product and procedure for making the same, said product to be porous and elastic and either tacky or non-tacky as required for various uses.

Heretofore a tacky rubber material has been provided which will stick to itself but not to the hair or skin. Such materials have been provided in a vulcanized non-porous, condition and in an unvulcanized, somewhat porous condition. The first is objectionable for lack of porosity and the second is objectionable for lack of elasticity and strength and for lack of uniformity in porosity. One purpose of the present invention is to provide a vulcanized, and therefore a strong, highly elastic and highly extensible material which will be uniformly porous and will be sufficiently tacky to stick to itself but not to the hair or skin.

All-rubber or fabric reinforced rubber garments and other articles comprising sheet rubber fabrics reinforced by woven or knitted fabrics, either stretchable or non-stretchable, etc., have heretofore been produced, but these articles and materials have not been entirely satisfactory because of their inability to permit free circulation of air through the material. Perforations have been formed in these materials to promote air circulation, but these materials even when perforated are uncomfortable to wear. Another purpose of the present invention is to provide a vulcanized, uniformly porous rubber product either reinforced or not with stretchable or non-stretchable fabrics which will permit free air circulation through the rubber structure.

It has been discovered by the present inventor that if a mist of well-defined globules of latex is sprayed upon a hot surface in such a way as to avoid the formation of a continuous stream of the liquid latex the particles will so agglomerate on said surface as to provide a porous structure of rubber, the porosity of which can be controlled by varying the distances of the spray guns from the heated surface or by varying the latex concentration or both. This procedure is utilized in carrying out all forms of the present invention.

The foregoing and other purposes of the invention may be attained in the procedure and articles illustrated in the accompanying drawings and described below. It is to be understood that the invention is not limited to the forms thereof shown and described.

Of the accompanying drawings,

Figure 1 is a side elevation, more or less diagrammatic and fragmentary, of equipment including a revolving drum and spray guns for making porous sheet rubber on a backing sheet and which may be used for bandage material;

Figure 2 is a section on line 2—2 of Figure 1;

Figure 3 is a detail end view of the spray guns shown associated with the drum;

Figure 4 is an enlarged detail showing the clamping of the backing sheet on the drum;

Figure 5 is an enlarged sectional view through a material provided and produced by the invention;

Figure 6 is an elevation showing the forming of the improved product directly to shape in the making of an article of porous rubber embodying the invention;

Figure 7 is a fragmentary plan, partly broken away, illustrating the improved material with a woven fabric reinforcement;

Figure 8 is a section on line 8—8 of Figure 7; and

Figure 9 is a view similar to Figure 7 showing the material with a reinforcement of stretchable fabric such as a knitted fabric.

Referring to Figures 1 to 5 of the drawings, the numeral 10 designates a hollow drum which may be journaled on roller bearings as at 11, 11 by a hollow shaft 12 into one end of which an inlet pipe 13 extends and into the other end of which there extends an outlet pipe 14 for circulating a hot fluid such as air through the drum. The drum is preferably provided with a central baffle 15 extending across the hollow shaft and outwardly to adjacent the periphery of the drum and the hollow shaft is formed with outlets at 16 and inlets at 17 whereby the hot fluid will be caused to circulate in a stream adjacent the periphery of the drum.

The drum 10 may be provided with a slot as at 18 in which is arranged clamps 19, 19 (forming no part of the present invention) whereby a backing sheet 20 of aluminum foil or the like may be applied about the drum and held smoothly under tension about the drum with its end portions engaged in said clamps (see Figure 4).

Associated with the drum 10 are a series of spray guns 21, 21 of a known type which may be connected to a latex supply pipe 22 and an air supply pipe 23. These guns are of a known type for delivering a mist of well-defined globules, instead of a stream of latex. The guns 21 may be carried on a support 21ᵃ which may be moved toward or from the drum 10.

A compacting roller 24 is also preferably associated with the drum and arranged to be raised therefrom and lowered thereon as desired as by being carried by arms 25, 25.

The equipment so far described is adapted for making a bandage material of liquid latex. The drum with the aluminum foil thereon will be heated to approximately 200° F. The spray guns 21 will be set about 18 inches from the drum periphery and a sixty percent concentrated rubber latex will be sprayed onto the drum while revolving at a slow speed, e. g. one revolution per minute. This operation will continue until the desired thickness of rubber is produced. Twenty-five coats of the material, i. e. twenty-five revolutions of the drum, will produce a satisfactory bandage material. A suitable latex composition for this purpose may comprise:—

| | Parts by weight |
|---|---|
| Rubber latex (60% concentration) of dry rubber | 100 |
| Water soluble resins ("Aquaresin") | 1 to 2 |
| Calcium hydroxide | .1 to 1 |
| Trisodium phosphate | .1 to .5 |
| Sodium fluoride | .1 to .2 |
| Zinc oxide | .5 |
| Sulphur | 1 to 1.5 |
| Zinc dimethyldithiocarbamate | .5 |

The deposited rubber may be more or less compacted as a sheet thereof is formed on the drum to vary the porosity by applying the compacting roller 24 to the drum at intervals during the building up of the porous rubber structure thereon. The resulting rubber material R on the foil backing 20 may be removed from the drum and may be cured for periods up to forty minutes or so at 275° F. in a heated room.

The bandage material thus made may be slit into strips of the desired width and length and rolled and packaged for sale. Being vulcanized it is strong, highly extensible, and elastic and may be applied about an affected member under considerable tension. By using a low percentage of sulphur or by using the water soluble resins or both in the compound the resulting material after cure is quite tacky and this tackiness which will gradually disappear with unprotected rubber bandage material is preserved by the protective metal foil backing sheet. The rubber being deposited on the backing sheet while quite hot, it will be apparent that the protected face of the bandage which may be applied against the affected member is quite sterile. As will be understood the bandage is self-securing by adhesion of lapped or butted portions thereof to each other, this adhesion being sufficient to secure the bandage even though applied under considerable tension.

Referring to Figure 6, the rubber latex compounded perhaps with additional sulphur and omitting the water soluble resins so that it will completely cure to a non-tacky state may be sprayed as by a gun 26 onto a heated form for making any desired porous rubber article such as a stocking, bathing suit, etc., a stocking form being shown in Figure 6. The deposited rubber is vulcanized preferably on the form. The form will be made somewhat smaller than the normal size of the article when fitted or in use and the porous rubber article will accordingly stretch upon application and will be snugly form-fitting and because of the porosity of the rubber will not affect the normal breathing of, and evaporation at, the surfaces of the skin. A stocking made as described will be effective for use in the treatment of varicose veins. The form may or may not first have a knitted or woven textile fabric backing applied thereto to reinforce the rubber article.

In Figures 7 and 8 the improved rubber material, either tacky or non-tacky, is shown applied on a woven textile backing and in Figure 9 on a knitted, stretchable, textile backing. Obviously such a backing as shown in these figures could be incorporated as a reinforcement between layers of the porous rubber material.

Modifications of the invention other than those disclosed herein may be resorted to without departing from the spirit thereof or the scope of the appended claims.

What is claimed is:—

1. That method for making a vulcanized, tacky, porous rubber material which comprises spraying a mist of well-defined globules of vulcanizable latex containing a tacky resin and sulphur sufficient only for partial cure onto a heated surface so as to avoid the formation of a continuous stream of the liquid latex on said surface but partly to dry and agglomerate the globules thereon, and curing said material, said globules adhering by surface contact and there being numerous interstices through the material between globules.

2. That method for making a vulcanized, tacky, porous, rubber material which comprises spraying a mist of well-defined globules of vulcanizable latex containing a tacky resin onto a heated surface so as to avoid the formation of a continuous stream of the liquid latex on said surface but partly to dry and agglomerate the globules thereon, and curing said material, said globules adhering by surface contact and there being numerous interstices through the material between globules.

3. That method for making a vulcanized, tacky, porous, rubber material which comprises spraying a mist of well-defined globules of vulcanizable latex containing sulphur sufficient only for partial cure onto a heated surface so as to avoid the formation of a continuous stream of the liquid latex on said surface but partly to dry and agglomerate the globules thereon, and curing said material, said globules adhering by surface contact and there being numerous interstices through the material between globules.

4. That method for making a vulcanized, tacky, porous rubber material which comprises spraying a mist of well-defined globules of vulcanizable latex onto a heated surface so as to avoid the formation of a continuous stream of the liquid latex on said surface but partly to dry and agglomerate the globules thereon, said globules adhering by surface contact and there being numerous interstices through the material between globules.

5. That method for making a porous, vulcanized, rubber material comprising spraying a mist of well defined globules of vulcanizable latex onto a heated surface so as to avoid the formation of a continuous stream of the liquid latex on said surface, said globules adhering by surface contact and there being numerous interstices through the material between globules.

6. That method for making a sterile bandage material of porous rubber comprising spraying a mist of well-defined globules of latex on a heated, impervious backing layer so as to avoid the formation of a continuous stream of liquid latex on said backing layer, and curing the deposited rubber, said globules adhering by surface contact and there being numerous interstices through the material between globules.

7. That method for making a porous rubber material comprising spraying a mist of well defined globules of latex onto a heated surface to agglomerate thereon without the formation of a continuous stream of liquid latex on said surface, and curing the structure of agglomerated globules thus produced, said globules adhering by surface contact and there being numerous interstices through the material between globules.

8. A rubber latex product comprising agglomerated, adhering, vulcanized rubber globules having communicating interstices therebetween to provide porosity.

9. A rubber latex product comprising tacky, agglomerated, adhering, vulcanized rubber globules having communicating interstices therebetween to provide porosity.

10. A rubber latex product comprising a sheet of agglomerated, adhering, vulcanized rubber globules having communicating interstices therebetween to provide porosity.

11. A bandage material comprising a backing material, and a coating of agglomerated, adhering, vulcanized rubber globules having communicating interstices therebetween to provide porosity.

12. A bandage material comprising an impervious, metallic, backing material, and a coating of agglomerated, adhering, vulcanized rubber globules having communicating interstices therebetween to provide porosity.

13. A bandage material comprising a foil backing material, and a coating of agglomerated, adhering, vulcanized rubber globules having communicating interstices therebetween to provide porosity.

14. A bandage material comprising a stretchable fabric backing material, and a coating of agglomerated, adhering, vulcanized rubber globules having communicating interstices therebetween to provide porosity.

15. A bandage material comprising a knitted fabric backing material, and a coating of agglomerated, adhering, vulcanized rubber globules having communicating interstices therebetween to provide porosity.

16. A bandage material comprising a woven fabric backing material, and a coating of agglomerated, adhering, vulcanized rubber globules having communicating interstices therebetween to provide porosity.

JOHN R. GAMMETER.